(12) United States Patent
Izumi

(10) Patent No.: US 10,456,864 B2
(45) Date of Patent: Oct. 29, 2019

(54) LASER PROCESSING SYSTEM HAVING FUNCTION OF CLEANING LASER OPTICAL PATH

(71) Applicant: FANUC CORPORATION, Minamitsuru-gun, Yamanashi (JP)

(72) Inventor: Takashi Izumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/266,259

(22) Filed: Sep. 15, 2016

(65) Prior Publication Data
US 2017/0080524 A1 Mar. 23, 2017

(30) Foreign Application Priority Data
Sep. 17, 2015 (JP) ................ 2015-184468

(51) Int. Cl.
| | |
|---|---|
| *B23K 26/14* | (2014.01) |
| *B23K 26/142* | (2014.01) |
| *B23K 26/70* | (2014.01) |
| *B23K 26/12* | (2014.01) |

(52) U.S. Cl.
CPC ........ *B23K 26/1437* (2015.10); *B23K 26/128* (2013.01); *B23K 26/142* (2015.10); *B23K 26/705* (2015.10); *B23K 26/707* (2015.10)

(58) Field of Classification Search
CPC ............. B23K 26/123; B23K 26/128; B23K 26/1476; B23K 26/03; B23K 26/142; B23K 26/1435; B23K 26/1436; B23K 26/702; B23K 26/00; B23K 26/0626; B23K 26/0853; B23K 26/0869; B23K 26/12; B23K 26/1224; B23K 26/127
USPC .............. 219/121.6, 121.84, 121.67, 121.83, 219/121.85, 121.78, 121.62, 121.63, 219/121.68, 121.72, 121.73, 121.86, 200, 219/548, 553
See application file for complete search history.

(56) References Cited

U.S. PATENT DOCUMENTS

| | | | |
|---|---|---|---|
| 6,894,248 B2 | 5/2005 | Arakawa et al. | |
| 7,170,607 B2 | 1/2007 | Yoon et al. | |
| 8,803,026 B2 | 8/2014 | Yokoi | |
| 2001/0055101 A1 | 12/2001 | Hayashi | |
| 2004/0179200 A1* | 9/2004 | Yoon ................ | G01N 21/1702 356/432 |
| 2005/0061778 A1* | 3/2005 | Arakawa ............... | B23K 26/03 219/121.6 |
| 2005/0150882 A1* | 7/2005 | Mori ..................... | B23K 26/12 219/121.84 |
| 2011/0220626 A1 | 9/2011 | Hammann et al. | |

(Continued)

FOREIGN PATENT DOCUMENTS

| | | |
|---|---|---|
| CN | 1522363 A | 8/2004 |
| CN | 1610598 A | 4/2005 |

(Continued)

*Primary Examiner* — Ibrahime A Abraham
*Assistant Examiner* — Chris Q Liu
(74) *Attorney, Agent, or Firm* — RatnerPrestia

(57) ABSTRACT

A laser processing system herein includes a laser oscillator, a laser optical path that guides laser beam from a laser beam emission port of the laser oscillator to a workpiece, an impure gas absorbent for absorbing impure gases that influence the propagation of the laser beam, and a shutter that exposes the impure gas absorbent in the laser optical path.

8 Claims, 11 Drawing Sheets

(56) References Cited

U.S. PATENT DOCUMENTS

2012/0241423 A1* 9/2012 Yokoi ................ B23K 26/0853
  219/121.62
2013/0126492 A1* 5/2013 Mori ...................... B23K 26/00
  219/121.83

FOREIGN PATENT DOCUMENTS

| CN | 102639279 A | 8/2012 |
| DE | 10108955 A1 | 10/2002 |
| JP | S61186186 A | 8/1986 |
| JP | H06277862 A | 10/1994 |
| JP | H07185871 A | 7/1995 |
| JP | 2000262844 A | 9/2000 |
| JP | 4335154 B2 | 9/2009 |
| JP | 2012148313 A | 8/2012 |
| WO | 2004103633 A1 | 12/2004 |

* cited by examiner

LASER PROCESSING SYSTEM HAVING FUNCTION OF CLEANING LASER OPTICAL PATH

BACKGROUND OF THE INVENTION

1. Field of the Invention

The present invention relates to a laser processing system including a laser optical path that guides laser beam emitted from a laser oscillator to an object to be processed.

2. Description of the Related Art

When such impure gases as to disperse or absorb laser beam is present around a laser oscillator, a large influence on the propagation of the laser beam is generated. Accordingly, in a conventional laser processing system in which the laser oscillator is mounted, a laser optical path including an optical system that guides the laser beam from a beam emission port of the laser oscillator to a processing point is provided. Moreover, such a laser optical path is filled with a clean purge gas that fails to influence the propagation of the laser beam, which allows laser processing to be stable.

Further, Japanese Patent Publication No. 4335154 discloses an invention of the conventional laser processing system as described above, in which a gas sensor for detecting impure gases is provided in the laser optical path to determine whether or not the impure gases were mixed in the laser optical path.

Moreover, in the invention disclosed in Japanese Patent Publication No. 4335154, the impure gases as described above that were mixed in the laser optical path are discharged out of the laser optical path by allowing a clean purge gas, such as nitrogen-rich gas that contains nitrogen as a main component, nitrogen gas and the like, to flow in the laser optical path. Further, Japanese Patent Publication No. 4335154 discloses, as the impure gases as described above, carbon dioxide and an organic solvent gas, such as ethanol or ammonia.

However, according to the invention disclosed in Japanese Patent Publication No. 4335154, a time needed for the purge gas to decrease concentrations of the organic solvent impure gases, such as ethanol, to concentrations at which laser processing is enabled is longer in comparison with a case in which the impure gases are carbon dioxide. A cause thereof is presumed to lie in that the organic solvent impure gases as described above are pseudo-chemically bonded to a wall surface in the laser optical path. In other words, the invention disclosed in Japanese Patent Publication No. 4335154 has a problem in that, when the organic solvent impure gases, such as ethanol, were mixed in the laser optical path, it will be difficult to promptly discharge the impure gases out of the laser optical path.

SUMMARY OF INVENTION

The present invention provides a laser processing system that can promptly discharge gases out of a laser optical path when the gases influencing the propagation of laser beam were mixed in the laser optical path.

According to the first aspect of the present invention, provided is a laser processing system including:
a laser oscillator configured to oscillate a laser beam;
a laser optical path that guides the laser beam from the laser oscillator to an object to be processed;
an impure gas absorbent for absorbing an impure gas that influences propagation of the laser beam; and
an exposure function part that is configured to expose the impure gas absorbent in the laser optical path.

According to the second aspect of the present invention, provided is the laser processing system according to the first aspect, further including:
a purge gas supply line for supplying a purge gas into the laser optical path.

According to the third aspect of the present invention, provided is the laser processing system according to the first aspect or the second aspect, further including:
an impure gas mixing detection device that is configured to detect that the impure gas was mixed in the laser optical path.

According to the fourth aspect of the present invention, provided is the laser processing system according to the third aspect, in which
the exposure function part is configured to expose the impure gas absorbent in the laser optical path when the impure gas mixing detection device detected that the impure gas was mixed in the laser optical path.

According to the fifth aspect of the present invention, provided is the laser processing system according to the third aspect or the fourth aspect, in which
the impure gas mixing detection device includes at least one gas sensor that detects the impure gas.

According to the sixth aspect of the present invention, provided is the laser processing system according to the third aspect or the fourth aspect, in which
the impure gas mixing detection device includes a microphone that detects that the impure gas was mixed in the laser optical path by collecting a sound when the laser beam propagates in the laser optical path.

According to the seventh aspect of the present invention, provided is the laser processing system according to the third aspect or the fourth aspect, in which
the impure gas mixing detection device includes a plate having an opening portion and a laser beam detector that detect that the impure gas was mixed in the laser optical path by detecting spreading of the laser beam in the laser optical path.

According to the eighth aspect of the present invention, provided is the laser processing system according to the third aspect or the fourth aspect, in which
the impure gas mixing detection device includes a beam power measuring device that detects that the impure gas was mixed in the laser optical path by detecting decreasing of a power of the laser beam in the laser optical path.

BRIEF DESCRIPTION OF THE DRAWINGS

These objects, features, and advantages of the present invention and other objects, features, and advantages will become further apparent from the detailed description of typical embodiments of the present invention that are illustrated in the accompanying drawings.

DETAILED DESCRIPTION

Next, embodiments of the present invention will be described with reference to the drawings. In the following figures, the same components will be assigned the same reference signs. In addition, it is assumed that the elements denoted by the same reference signs in different drawings denote elements having the same functions. Further, to facilitate understanding, these figures are suitably changed in scale.

First Embodiment

Figure 1:
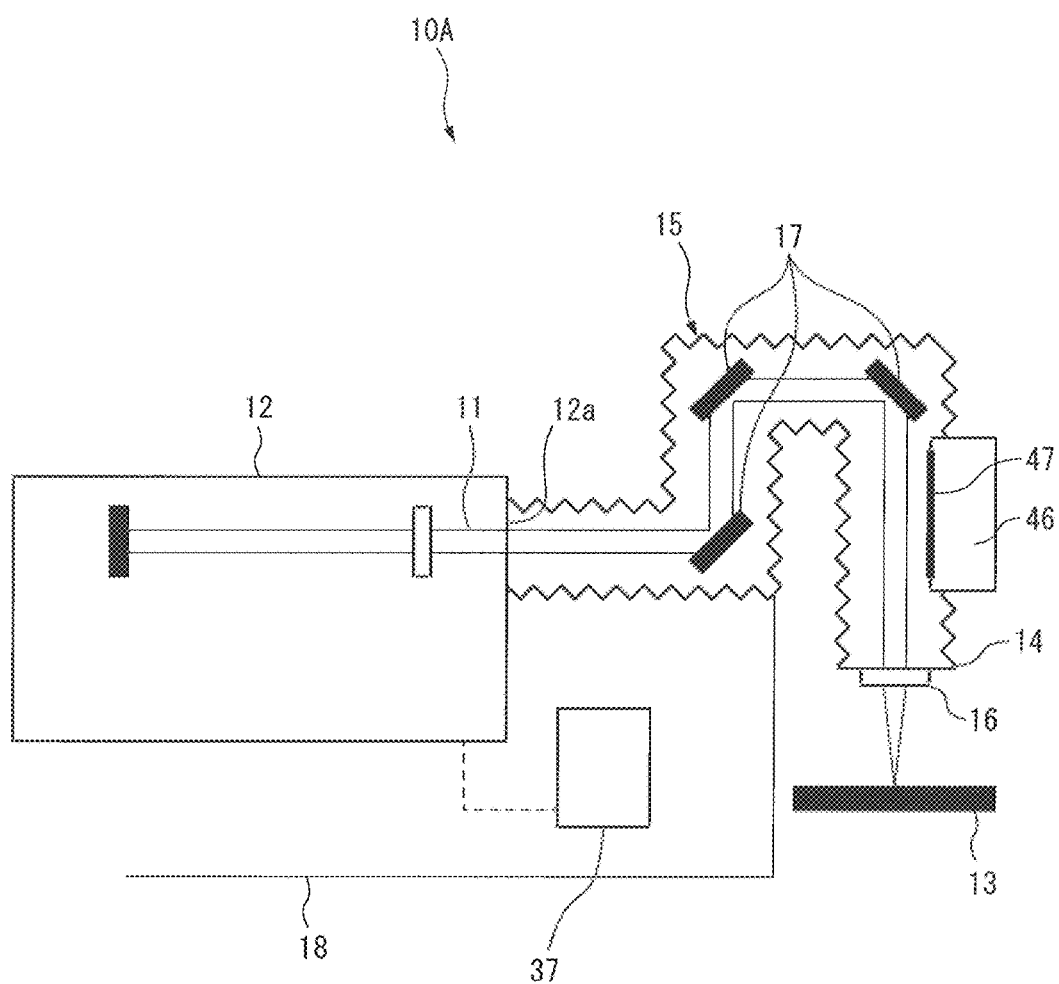
FIG. 1 is a block diagram schematically illustrating a configuration of a laser processing system according to a first embodiment.

FIG. 1 is a block diagram schematically illustrating a configuration of a laser processing system according to a first embodiment.

As illustrated in FIG. 1, a laser processing system 10A according to the first embodiment includes a laser oscillator 12 that oscillates laser beam 11, a processing head unit 14 that radiates the laser beam 11 over a workpiece 13 that is an object to be processed, and a laser optical path 15 that guides the laser beam 11 from a laser beam emission port 12a of the laser oscillator 12 to the workpiece 13 while an optical axis thereof is maintained. Further, the laser processing system 10A includes a numerical value calculator 37 as a control device that controls an operation of the laser oscillator 12 and a movement of the processing head unit 14.

The laser oscillator 12 is a carbonic acid gas laser that processes a metal or a nonmetal using a laser in a factory. However, the laser oscillator applied to the present invention is not limited thereto, but may be another gas laser, or a solid state laser, a semiconductor laser, or the like.

The processing head unit 14 is provided with a condenser lens 16 that collects the laser beam 11 over the workpiece 13. Further, as illustrated in FIG. 1, an optical system, such as mirrors 17 that guide the laser beam 11 emitted from the laser oscillator 12 to the condenser lens 16 of the processing head unit 14 while bending the same in a bending direction of the laser optical path 15, is installed in the laser optical path 15. In addition, the processing head unit 14 is configured to be capable of relatively moving in relation to the workpiece 13 using unillustrated guide member and drive mechanism. Accordingly, the laser optical path 15 is made of an elastic bellows made of, for example, a rubber or a metal. As a matter of course, the laser optical path 15 is not limited to that made of a bellows. The laser optical path 15 may be that in which, for example, bending portions of the laser optical path 15 are made of a bellows and the other portions are made of a metal pipe.

Moreover, when a thinner or a paint is used in the vicinity of the laser processing system 10A as described above, organic solvent gases, such as ethanol or ammonia, may be mixed in the laser optical path 15. Such organic solvent gases cause absorption and scattering of the laser beam, and, as a result, hinder the propagation of the laser beam and lower a processing ability of a laser processing machine. Accordingly, as illustrated in FIG. 1, to the laser optical path 15, a purge gas supply tube 18 is connected. Further, from the purge gas supply tube 18, a purge gas that fails to influence the propagation of the laser beam 11, such as nitrogen-rich gas or nitrogen gas, is configured to be supplied into the laser optical path 15.

Further, in the present embodiment, as illustrated in FIG. 1, the laser processing system 10A includes an impure gas absorbent 46 that absorbs gases including the organic solvent gases (hereinafter referred to as impure gases) that influence the propagation of the laser beam 11 and a shutter 47 that is an exposure function part for exposing the impure gas absorbent 46 in the laser optical path 15. More specifically, the shutter 47 is configured as a wall portion that is a part of the laser optical path 15. Further, the shutter 47 is provided between the laser optical path 15 and the impure gas absorbent 46.

In the first embodiment, when a malfunction of laser processing occurs, an operator checks a position displacement and a propagation property of the laser beam 11 at a processing point on the workpiece 13, and investigates a cause of the malfunction of the laser processing. When there is no position displacement of the laser beam 11 but there is abnormality of the propagation property of the laser beam 11, the impure gases may be mixed in the laser optical path 15. In this case, the operator specifies and eliminates the cause of a mixing of the impure gases, and then opens the shutter 47 located at the wall portion of the laser optical path 15 and exposes the impure gas absorbent 46 into the laser optical path 15. Then, when the operator confirms that there is no abnormality of the propagation property of the laser beam 11 at the processing point on the workpiece 13, the laser processing is started.

Figure 2:
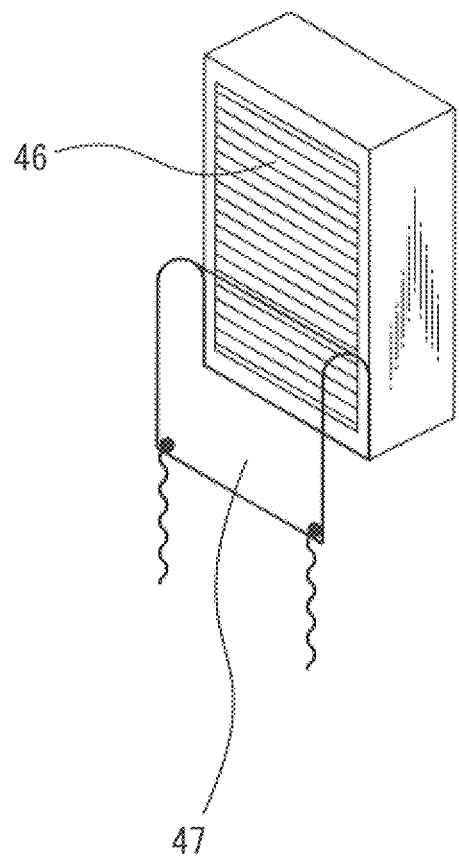
FIG. 2 is a perspective view illustrating a configuration example of an impure gas absorbent and a shutter of the laser processing system as illustrated in FIG. 1.

FIG. 2 is a perspective view illustrating a configuration example of the impure gas absorbent 46 and the shutter 47 of the laser processing system 10A as illustrated in FIG. 1. As illustrated in FIG. 2, as the impure gas absorbent 46, a folded body in which a sheet containing a zeolite is folded is used. However, the impure gas absorbent 46 is not limited to the zeolite sheet, but may be a honeycomb formed body in which a sheet containing an impure gas absorbent is formed into a honeycomb shape, a grain assembly, or a gel body. Further, as the shutter 47 in the first embodiment, a flexible film provided in such a manner as to cover the impure gas absorbent 46 is used. When the impure gas absorbent 46 is exposed in the laser optical path 15, the operator preferably displaces the shutter 47 of the flexible film to expose the impure gas absorbent 46, as illustrated in FIG. 2.

Second Embodiment

Next, a second embodiment of the present invention will be described. Note that, hereinafter, points different from the first embodiment as described above will be mainly described, and the same constituting elements as those in the first embodiment as described above will be assigned the same reference signs and the description thereof will be accordingly omitted.

Figure 3:
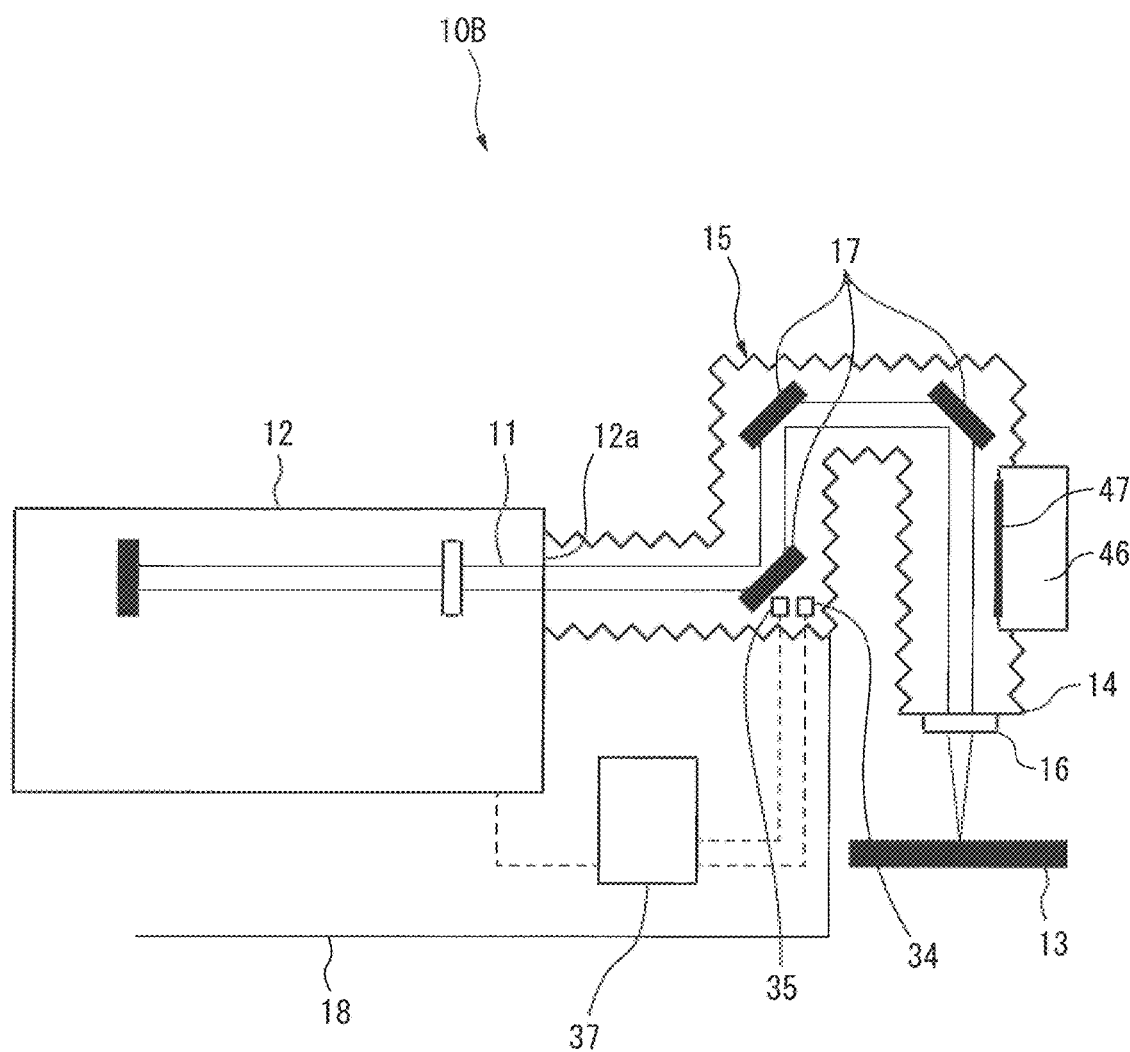
FIG. 3 is a block diagram schematically illustrating a configuration of a laser processing system according to a second embodiment.

FIG. 3 is a block diagram schematically illustrating a configuration of a laser processing system according to the second embodiment.

In contrast to the laser processing system 10A according to the first embodiment, a laser processing system 10B according to the second embodiment further includes an impure gas mixing detection device that detects a mixing of the impure gases in the laser optical path 15. Specifically, as illustrated in FIG. 3, a plurality of impure gas sensors 34, 35 that detect the plurality of impure gases, respectively, are installed in the laser optical path 15.

Further, the impure gas sensors 34, 35 are each electrically connected to the numerical value calculator 37. The numerical value calculator 37 has a function of determining, based on an output value outputted from each of the impure gas sensors 34, 35, whether gases mixed in the laser optical path 15 influence the propagation of the laser beam 11. Then, when the numerical value calculator 37 determines that the gases mixed in the laser optical path 15 influence the propagation of the laser beam the shutter 47 is allowed to operate to expose the impure gas absorbent 46 in the laser optical path 15.

Figure 4:
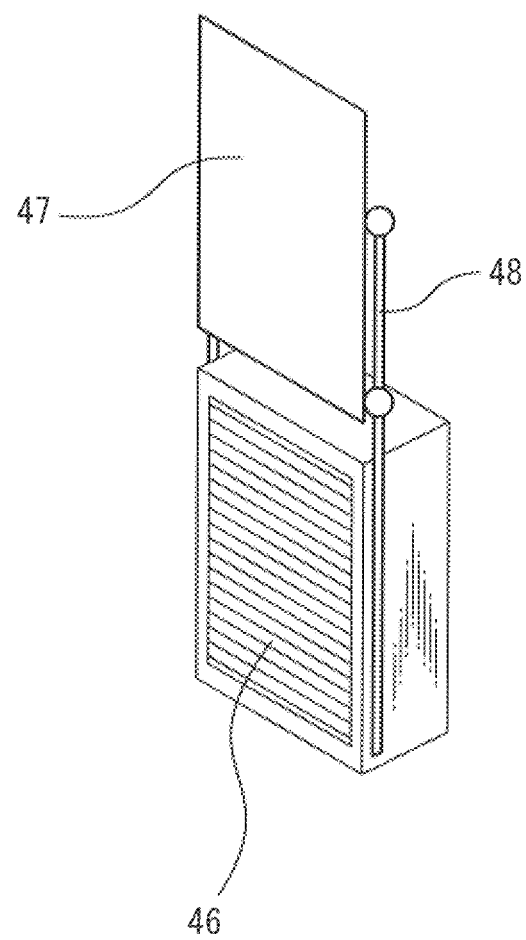
FIG. 4 is a perspective view illustrating a configuration example of the impure gas absorbent and the shutter of the laser processing system as illustrated in FIG. 3.

FIG. 4 is a perspective view illustrating a configuration example of the impure gas absorbent 46 and the shutter 47 of the laser processing system 10B as illustrated in FIG. 3. Similarly to the first embodiment as described above, the impure gas absorbent 46 as illustrated in FIG. 4 is a folded body in which a sheet containing a zeolite is folded. Note that, as described relative to the first embodiment as described above, the impure gas absorbent 46 may be a honeycomb formed body in which a sheet containing an impure gas absorbent is formed into a honeycomb shape, a grain assembly, or a gel body. Meanwhile, the shutter 47 in the second embodiment is provided with a slide drive device 48 as illustrated in FIG. 4. Then, when the impure gas absorbent 46 is exposed in the laser optical path 15, the numerical value calculator 37 in the second embodiment drives the slide drive device 48 to slide the shutter 47.

Further, the impure gas sensors 34, 35 in the present embodiment are each, for example, a catalytic combustion type gas sensor that detects ethanol. As a matter of course, as the impure gas sensors 34, 35, a gas sensor other than the catalytic combustion type gas sensor may be used. Thus, as the gas sensors used as the impure gas sensors 34, 35, any of a controlled potential electrolysis type gas sensor, a catalytic combustion type gas sensor, a gas heat conduction type gas sensor, a semiconductor type gas sensor, and an electrochemical gas sensor may be suitable.

Further, since the gases that influence the propagation of the laser beam 11, i.e., the impure gases include sulfur hexafluoride, ethylene, halogenated hydrocarbon, ammonia, acetone, alcohol, a carbonic acid gas, and the like, the impure gases to be detected are not limited to ethanol. Accordingly, in the present embodiment, in addition to the two impure gas sensors 34, 35 that detect ethanol, a gas sensor that detects an impure gas different from ethanol may be installed in the laser optical path 15. Alternatively, either of the two impure gas sensors 34, 35 may be a gas sensor that detects an impure gas different from ethanol.

Note that, hereinafter, the impure gas sensors 34, 35 will be described as ethanol sensors, based on which the description will be made.

In the present embodiment, the two ethanol sensors 34, 35 having different concentration ranges within which ethanol is detected are installed in the laser optical path 15. For example, the ethanol sensor 34 on one hand detects an ethanol concentration of 10 to 300 ppm (0.001 to 0.03%). The ethanol sensor 35 on the other hand detects an ethanol concentration of 200 to 1000 ppm (0.02 to 0.1%). Thus, in the present embodiment, as the ethanol sensor 35 on the other hand, a gas sensor that detects an ethanol having a higher concentration than the ethanol sensor 34 on one hand, i.e., a gas sensor having a lower sensitivity than the ethanol sensor 34 on one hand is used. The catalytic combustion type ethanol sensors 34, 35 may each react against a gas other than ethanol, such as oxygen, and the output value may be shifted. In this case, the output value of the ethanol sensor 34 having a good sensitivity may exceed a maximum value, which causes saturation, and may be no longer capable of detecting ethanol. For the prevention thereof, in the present embodiment, the two ethanol sensors 34, 35 having different sensitivities are installed in the laser optical path 15.

In addition, as the ethanol sensors 34, 35 in the present embodiment, a catalytic combustion type ethanol sensor having such a configuration as described below is preferably adopted. For example, the catalytic combustion type ethanol sensor is made of a sensor element that reacts against ethanol which is a combustible gas and a reference element that fails to react against the ethanol. The sensor element includes a heater coil made of a noble metal, such as platinum, and a combustion catalyst layer formed on an outer circumference of the heater coil. The combustion catalyst layer is made by, for example, dispersing a combustion catalyst, such as platinum and palladium, over an alumina. On the other hand, the reference element is a combustion catalyst layer of a component constituting the sensor element that is composed only of an alumina to which the combustion catalyst is not added.

When ethanol that is a combustible gas contacts with a surface of the sensor element of the above ethanol sensor, combustion occurs due to a catalytic action of the noble metal of the combustion catalyst layer, a temperature of the heater coil increases, and an electric resistance increases. On the other hand, in the reference element, combustion does not occur even in contact with ethanol, and accordingly, the electric resistance does not change. When the ethanol sensor made of such a sensor element and a reference element is exposed to ethanol, only the electric resistance of the sensor element increases. At this time, a difference of the electric resistance between the sensor element and the reference element is measured as a voltage value using a Wheatstone bridge circuit, so that the ethanol concentration is calculated. In other words, since there is a proportional relationship between the voltage value and the ethanol concentration, the ethanol concentration can be calculated based on the measured voltage value. Thus, the laser processing system 10B according to the present embodiment can also calculate the ethanol concentration based on the output value of the impure gas sensors (each of the ethanol sensors 34, 35). However, in the present invention, since it is sufficient that whether or not the impure gases were mixed in the laser optical path 15 as illustrated in FIG. 3 can be determined, the output value of each of the ethanol sensors 34, 35 may be only monitored and the ethanol concentration may not be calculated. Note that, in a manner similar to the impure gas sensors 34, 35 in the present embodiment, to change a concentration range of the ethanol concentration that can be measured, a composition, a surface area, and the like of the combustion catalyst layer of the sensor element as described above may be changed, and thereby an increase rate of the electric resistance and a combustion heat when ethanol contacts with the combustion catalyst layer may be changed.

Next, a configuration of the numerical value calculator 37 according to the second embodiment will be described.

Figure 5:
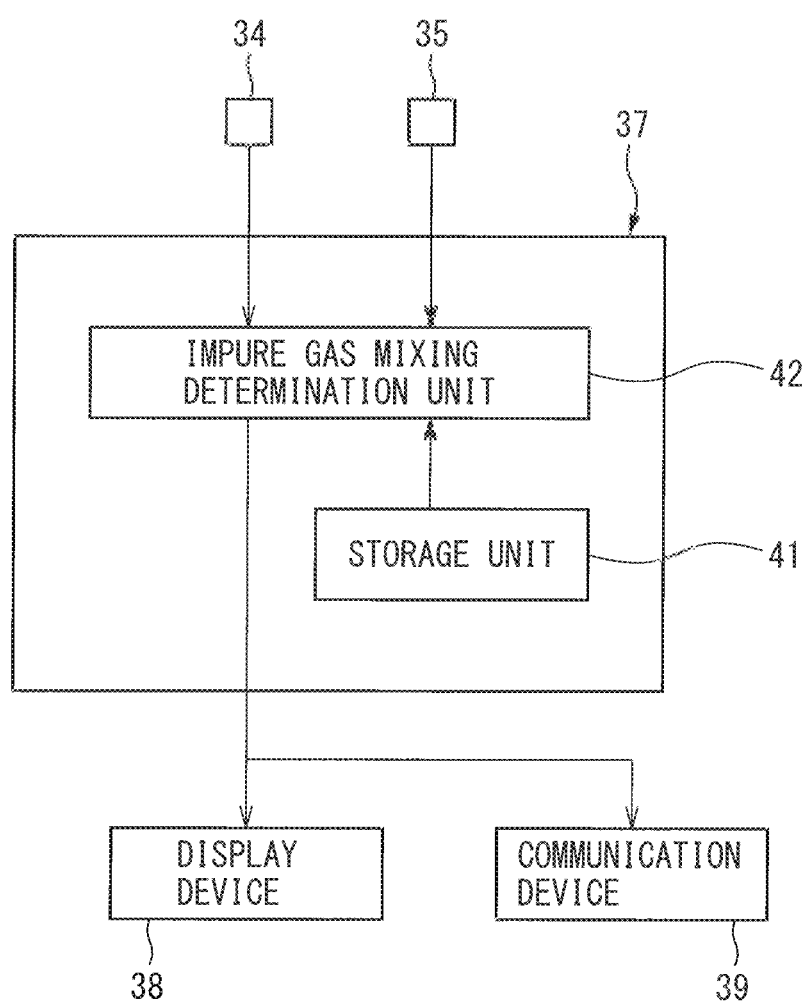
FIG. 5 is a block diagram illustrating a configuration example of a numerical value calculator as illustrated in FIG. 3.

FIG. 5 is a block diagram illustrating a configuration example of the numerical value calculator 37 as illustrated in FIG. 3.

As illustrated in FIG. 5, the numerical value calculator 37 includes a storage unit 41 and an impure gas mixing determination unit 42.

Further, the storage unit 41 stores a determination threshold value set in advance with respect to each of the ethanol sensors 34, 35. The impure gas mixing determination unit 42 compares the output value of each of the ethanol sensors 34, 35 and the determination threshold value set in advance with respect to each of the ethanol sensors 34, 35, and determines based on a comparison result thereof whether or not an ethanol having a predetermined concentration was mixed in the laser optical path 15. The determination threshold values are thus used so that, without accurately detecting a type and concentration of the impure gases, whether or not the impure gases were mixed in the laser optical path 15 can be determined. Accordingly, the impure gas mixing determination unit 42 has a low-cost and simple configuration.

Further, to the numerical value calculator 37, a display device 38 that displays a determination result of the impure gas mixing determination unit 42 is preferably connected. The display device 38 may preferably display, together with the determination result of the impure gas mixing determination unit 42, a change of the output value of each of the ethanol sensors 34, 35 with passage of time through classification by respective colors. Accordingly, a mixing timing of the impure gases becomes clear and specifying a cause of the mixing of the impure gases is facilitated. Further, when the output value of each of the ethanol sensors 34, 35 is respectively greater than the determination threshold value that is set with respect to each of the ethanol sensors 34, 35, the impure gas mixing determination unit 42 preferably allows the display device 38 to display an alarm message.

Note that the display device 38 is preferably composed of, for example, a cathode ray tube (CRT), a liquid crystal display, or the like.

Further, as illustrated in FIG. 5, the numerical value calculator 37 preferably includes a communication device 39 that communicates the determination result of the impure gas mixing determination unit 42 to the exterior of the laser processing system. The communication device 39 preferably communicates, by, for example, sound, light, or a combination thereof, that the impure gases were mixed in the laser optical path 15. Thereby, the operator of the laser processing system 10B can promptly recognize a mixing of the impure gases in the laser optical path 15. Further, a malfunction during laser processing can be prevented beforehand or laser processing can be stopped at an early stage so that damage due to a processing defect can be restrained to a minimum. In addition, a cause of a malfunction during laser processing can be promptly specified and eliminated so that productivity is also improved.

Further, the storage unit 41 of the numerical value calculator 37 preferably stores, at every certain time, the output value of each of the ethanol sensors 34, 35 together with the date and hour. In other words, a cause of a mixing of the impure gases in the laser optical path 15 is often a malfunction of the laser processing system 10B itself, such as a sealing degree of the laser optical path 15. Thus, if the output values of the impure gas sensors are stored, at every certain time, together with the date and hour, when abnormality is generated, a cause of the abnormality can be easily specified using information thus stored.

Note that, except the configuration as described above, the configuration of the laser processing system 10B according to the second embodiment is the same as that of the laser processing system 10A according to the first embodiment.

Figure 6:
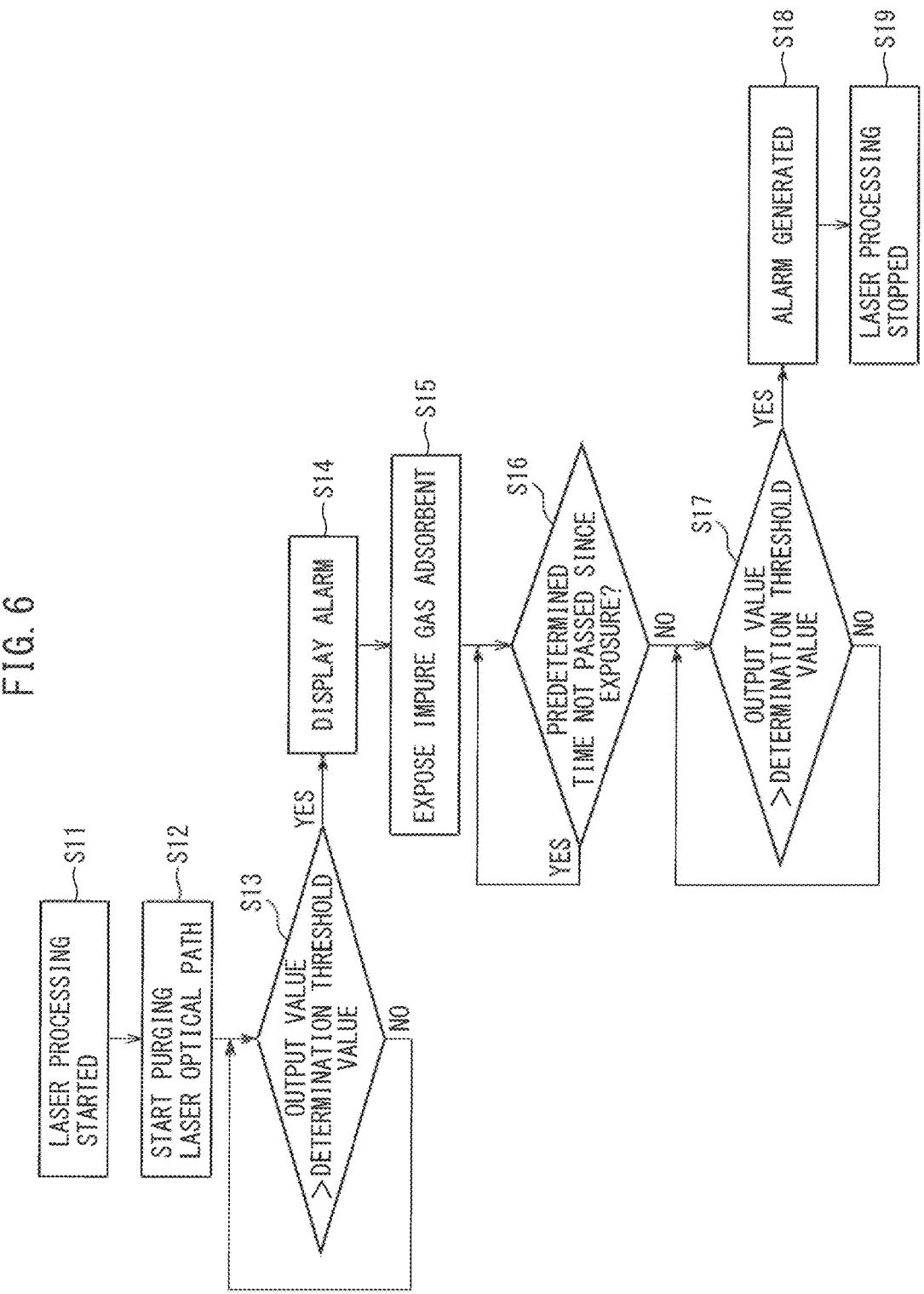
FIG. 6 is a flowchart illustrating an example of an operation of the laser processing system according to the second embodiment.

Next, an example of an operation of the laser processing system 10B according to the second embodiment as described above will be described with reference to FIGS. 3, 5, and 6. FIG. 6 is a flowchart illustrating an example of an operation of the laser processing system 10B according to the second embodiment.

First, the laser processing system 10B is activated to start laser processing (step S11 of FIG. 6). Then, purging the laser optical path 15 is started (step S12 of FIG. 6). At this time, as the purge gas, nitrogen-rich gas or nitrogen gas is supplied into the laser optical path 15.

Subsequently, the numerical value calculator 37 displays the output value outputted from each of the ethanol sensors 34, 35 on the display device 38. Further, the impure gas mixing determination unit 42 of the numerical value calculator 37 determines whether or not the output value of each of the ethanol sensors 34, 35 is respectively greater than the determination threshold value of each of the ethanol sensors 34, 35 (step S13 of FIG. 6).

In step S13 as described above, when the output value of each of the ethanol sensors 34, 35 is not respectively greater than the determination threshold value of each of the ethanol sensors 34, 35, the impure gas mixing determination unit 42 continues step S13 as described above. On the other hand, in step S13 as described above, when the output value of each of the ethanol sensors 34, 35 is respectively greater than the determination threshold value of each of the ethanol sensors 34, 35, the impure gas mixing determination unit 42 determines that ethanol was mixed in the laser optical path 15, generates an alarm, and, for example, displays the alarm on the display device 38 (step S14 of FIG. 6). With respect to the alarm, an alarm message, such as "abnormal gas in laser optical path," is displayed on the display device 38.

Further, after generation of the alarm as described above, the numerical value calculator 37 allows the shutter 47 to open to expose the impure gas absorbent 46 in the laser optical path 15 (step S15 of FIG. 6). Meanwhile, the operator of the laser processing system 10B investigates around the laser processing system 10B in accordance with the alarm as described above and eliminates a cause of generation of the impure gases. Such an operation of eliminating the cause of generation of the impure gases requires time. Consequently, in the present embodiment, it is configured such that, after exposure of the impure gas absorbent 46, a time for eliminating the cause of generation of the impure gases is taken, and then whether or not the impure gas concentrations in the laser optical path 15 exceed the threshold values is determined. Accordingly, the numerical value calculator 37 in the present embodiment determines whether or not a predetermined time passes since the exposure of the impure gas absorbent 46 (step S16 of FIG. 6). Then, if the predetermined time is passed, the numerical value calculator 37 determines again whether or not the output value of each of the ethanol sensors 34, 35 is respectively greater than the determination threshold value of each of the ethanol sensors 34, 35 (step S17 of FIG. 6).

In step S17 as described above, when the output value of each of the ethanol sensors 34, 35 is not respectively greater than the determination threshold value of each of the ethanol sensors 34, 35, stopping the laser processing is unneeded. Consequently, the numerical value calculator 37 continues monitoring the output of each of the ethanol sensors 34, 35.

On the other hand, in step S17 as described above, when the output value of each of the ethanol sensors 34, 35 is respectively greater than the determination threshold value of each of the ethanol sensors 34, 35, such a large amount of impure gases that the impure gas absorbent 46 fails to absorb are presumably mixed in the laser optical path 15. Or, presumably, the cause of generation of the impure gases as described above is still not eliminated and the impure gases remain in the laser optical path 15. Accordingly, the numerical value calculator 37 allows the communication device 39 to generate an alarm composed of sound, light, or a combination thereof (step S18 of FIG. 6) and stops the laser processing (step S19 of FIG. 6). Note that the gas absorbent 46 is preferably replaced by a new one while the laser processing is stopped.

Next, effects of a case in which the laser processing system 10B has the function of exposing the impure gas absorbent 46 in the laser optical path 15 will be described.

For example, when gases including ethanol that causes dispersion of a carbonic acid gas laser are mixed in the laser optical path 15, decreasing an ethanol concentration in the laser optical path 15 to such a concentration as to enable the laser processing takes time even by supplying the purge gas, such as nitrogen gas, into the laser optical path 15. In this case, when the purge gas, such as nitrogen gas, is supplied into the laser optical path 15 while the impure gas absorbent 46 is exposed in the laser optical path 15, the ethanol concentration in the laser optical path 15 can be decreased in a short time. This point can be further understood from FIG. 7.

Figure 7:
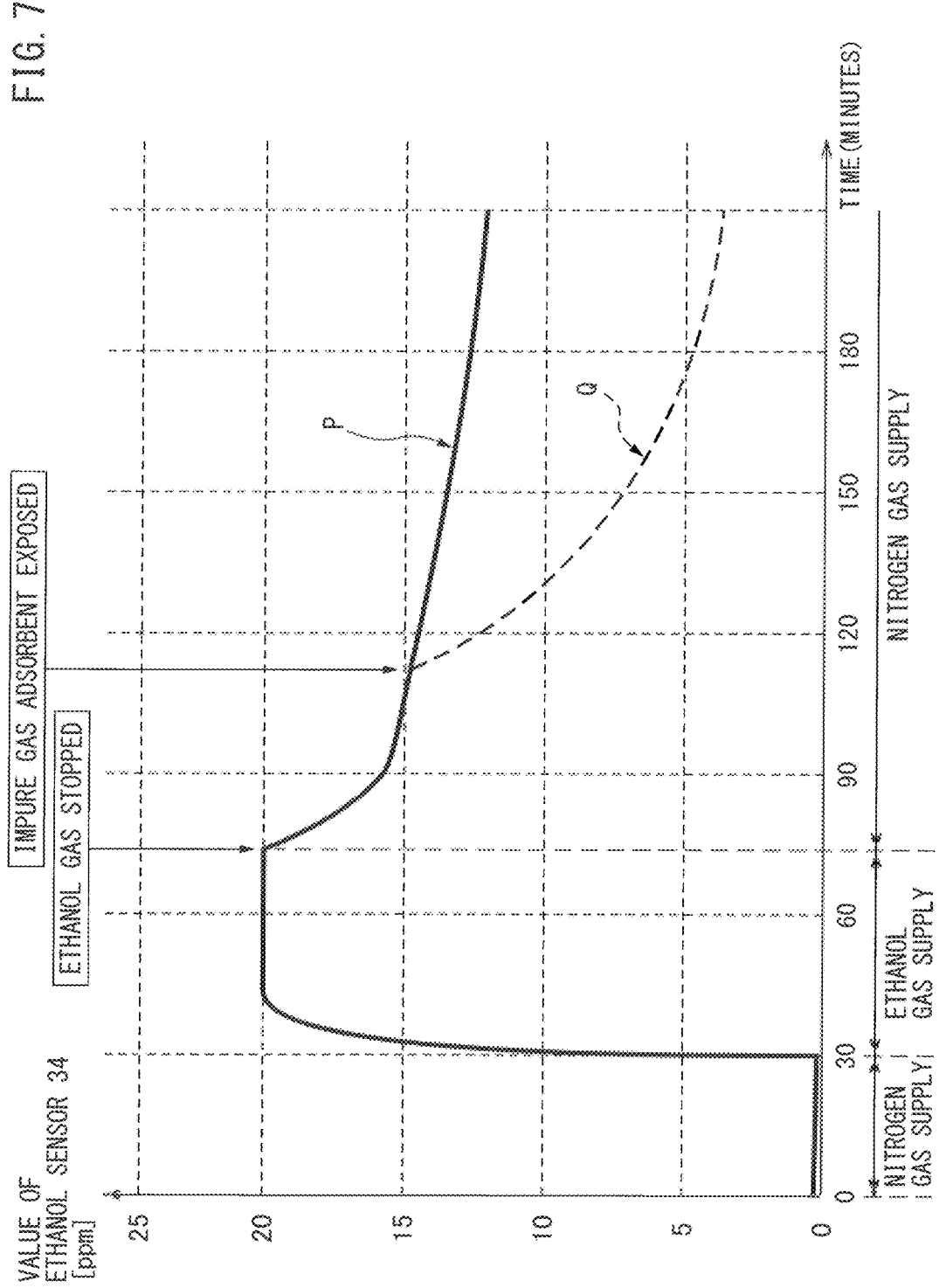
FIG. 7 is a graph illustrating effects of a function of exposing the impure gas absorbent in a laser optical path in the second embodiment.

FIG. 7 is a graph illustrating effects of the function of exposing the impure gas absorbent 46 in the laser optical path 15. In particular, the graph as illustrated in FIG. 7 is obtained by the following process. First, in the laser processing system 10B as illustrated in FIG. 3, only the catalytic combustion type ethanol sensor 34 is installed in the laser optical path 15 and nitrogen gas is supplied into the laser optical path 15 for approximately 30 minutes. Then, an air containing 20 ppm ethanol gas is supplied into the laser optical path 15 for approximately 45 minutes. Subsequently, the nitrogen gas is again supplied into the laser optical path 15. In other words, FIG. 7 is a graph in which a change of the ethanol concentration with passage of time while the gases supplied into the laser optical path 15 are thus sequentially switched is measured by the ethanol sensor 34.

As apparent from a solid line P in FIG. 7, while L, nitrogen gas that replaces the air containing 20 ppm ethanol gas is supplied into the laser optical path 15, the ethanol concentration decreases in accordance with time, but a decreasing speed of the ethanol concentration is relatively slow. It is assumed that this is because a pseudo-chemical bond between a wall surface in the laser optical path 15 and ethanol is generated. When such a pseudo-chemical bond is generated, continuing supplying the nitrogen gas into the laser optical path 15 for a long time and decreasing the ethanol concentration in the laser optical path 15 to concentration at which the stable laser processing can be performed are needed. However, when the nitrogen gas that replaces the air containing the ethanol gas is supplied into the laser optical path 15 and further the impure gas absorbent 46 is exposed in the laser optical path 15, the decreasing speed of the ethanol concentration largely increases, as indicated by a dashed line Q in FIG. 7.

Thus, in the second embodiment, as described above, when the impure gas mixing determination unit 42 determines that the impure gases were mixed in the laser optical path 15, an alarm is displayed on the display device 38. Accordingly, the operator investigates around the laser processing system 10B and eliminates a cause of generation of the impure gases. In addition, the impure gas mixing determination unit 42 is configured to allow the display device 38 to display the alarm, and open the shutter 47 to expose the impure gas absorbent 46 in the laser optical path 15. Thereby, as illustrated in FIG. 7, the concentrations of the impure gases in the laser optical path 15 can be decreased in a short time. Note that the effects can be similarly obtained in the first embodiment as described above as well.

Third Embodiment

Next, a third embodiment of the present invention will be described. Note that, hereinafter, points different from the first embodiment and the second embodiment as described above will be mainly described, and the same constituting elements as those in the first embodiment and the second embodiment as described above will be assigned the same reference signs and the description thereof will be accordingly omitted.

Figure 8:
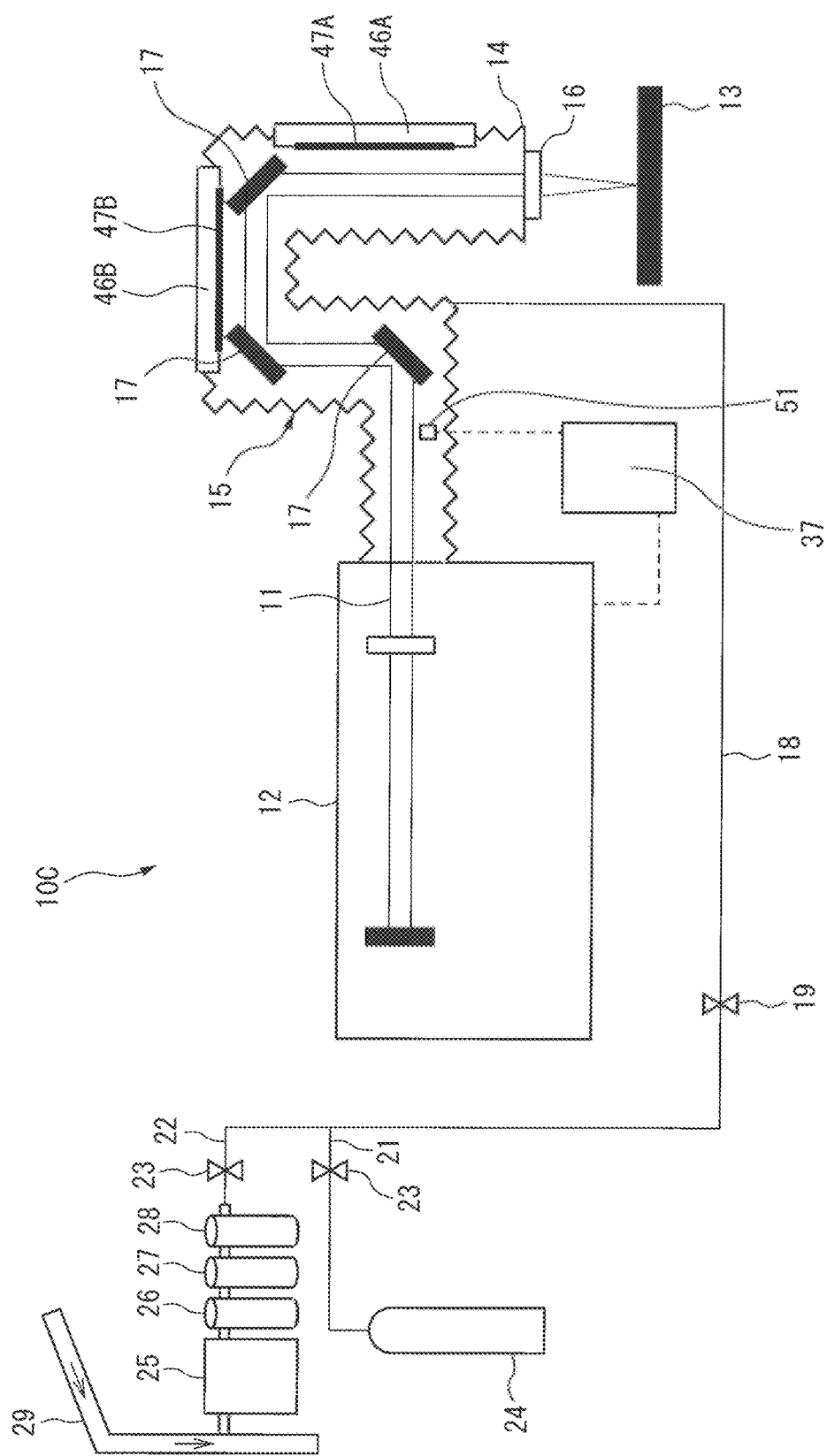
FIG. 8 is a block diagram schematically illustrating a configuration of a laser processing system according to a third embodiment.

FIG. 8 is a block diagram schematically illustrating a configuration of a laser processing system according to the third embodiment.

In the first embodiment and the second embodiment as described above, as a configuration of exposing the impure gas absorbent in the laser optical path 15, one pair of the impure gas absorbent 46 and the shutter 47 is illustrated. However, in the present invention, the number of pairs of the impure gas absorbent 46 and the shutter 47 is not limited to one, but may be two or more. Thus, in a laser processing system 10C according to the third embodiment as illustrated in FIG. 8, at two parts of the wall portion of the laser optical path 15, a pair of an impure gas absorbent 46A and a shutter 47A and a pair of an impure gas absorbent 46B and a shutter 47B are respectively installed.

Moreover, in the second embodiment as described above, as the impure gas mixing detection device that detects a mixing of the impure gases in the laser optical path 15, the gas sensor is used. However, in the present invention, without directly detecting gases in the laser optical path 15, determination of a mixing of the impure gases in the laser optical path 15 may be made by detecting abnormality of the propagation of the laser beam 11. Thus, the impure gas mixing detection device is not limited to the gas sensor. Then, in the laser processing system 10C according to the third embodiment as illustrated in FIG. 8, a microphone 51 is used in place of the ethanol sensors 34, 35 in the second embodiment as described above.

In other words, the laser beam 11, such as a carbonic acid gas laser, induces an acoustic wave (so called a photoacoustic effect) when propagating in the laser optical path 15. Accordingly, a sound of the laser beam 11 is collected by the microphone 51 and analyzed so that whether or not abnormality of the propagation of the laser beam 11 is generated is clarified. Thus, the laser processing system 10C according to the third embodiment is configured to determine that the impure gases were mixed in the laser optical path 15 if there is abnormality of the propagation of the laser beam 11. Note that, when there is abnormality of the propagation of the laser beam 11, an output value outputted from the microphone 51 is greater in comparison with a case in which the propagation of the laser beam 11 is normal.

Note that, also in the present embodiment, the numerical value calculator 37, the display device 38, and the communication device 39 (see FIG. 5) that are the same as those in the second embodiment as described above are used.

Moreover, in the first embodiment and the second embodiment as described above, a configuration of supplying the purge gas, such as nitrogen gas, that fails to influence the propagation of the laser beam 11 through the purge gas supply tube 18 into the laser optical path 15 is illustrated. However, in the present invention, types of the purge gas supplied into the laser optical path 15 can be preferably switched. Thus, in the laser processing system 10C according to the third embodiment as illustrated in FIG. 8, either of two types of the purge gas, such as nitrogen gas and a clean dry air, is configured to be selected and to be capable of being supplied into the laser optical path 15.

Specifically, as illustrated in FIG. 8, the purge gas supply tube 18 is provided with a flow rate adjustment valve 19. Then, it is configured such that the flow rate adjustment valve 19 adjusts a supply rate of the purge gas into the laser optical path 15. Further, to a portion of the purge gas supply tube 18 upstream of the flow rate adjustment valve 19, a supply line 21 of the nitrogen gas and a supply line 22 of the clean dry air are each connected. Each of the supply lines 21, 22 is provided with an opening and closing valve 23. Then, one of the two opening and closing valves 23 is opened, so that the purge gas supplied into the laser optical path 15 is selected.

Then, to the supply line 21 of the nitrogen gas, a nitrogen gas cylinder 24 and the opening and closing valve 23 are serially connected sequentially along a flow direction of the nitrogen gas. The opening and closing valve 23 may be a flow rate control valve. To supply the nitrogen gas into the laser optical path 15, only the opening and closing valve 23 of the supply line 21 is opened and the opening and closing valve 23 of the supply line 22 is closed. Thereby, the nitrogen gas that fills the nitrogen gas cylinder 24 is supplied via the purge gas supply tube 18 into the laser optical path 15.

In addition, to the supply line 22 of the clean dry air, a compressor 25, a dust collecting filter 26, an oil mist filter 27, an activated carbon filter 28, and the opening and closing valve 23 are serially connected sequentially along a flow direction of the air. Further, to the compressor 25, a compressed air line 29 of the factory is connected. To supply the clean dry air into the laser optical path 15, only the opening and closing valve 23 of the supply line 22 is opened and the other opening valve 23 of the supply line 21 is closed. Thereby, the air flowing through the compressed air line 29 of the factory is allowed to pass sequentially through the compressor 25, the dust collecting filter 26, then oil mist filter 27, and the activated carbon filter 28. As a result, impurities, oil components, water components, and organic components in the compressed air of the factory are removed. In other words, the clean dry air is supplied via the purge gas supply tube 18 into the laser optical path 15.

Note that, except the configuration as described above, the configuration of the laser processing system 10C according to the third embodiment is the same as that of the laser processing system 10B according to the second embodiment.

Next, an example of an operation of the laser processing system 10C according to the third embodiment as described above will be described with reference to FIGS. 8, 9A, and 9B. Note that, also in the present embodiment, the numerical value calculator 37, the display device 38, and the communication device 39 (see FIG. 5) that are the same as those in the second embodiment as described above are used to perform the laser processing.

Figure 9A:
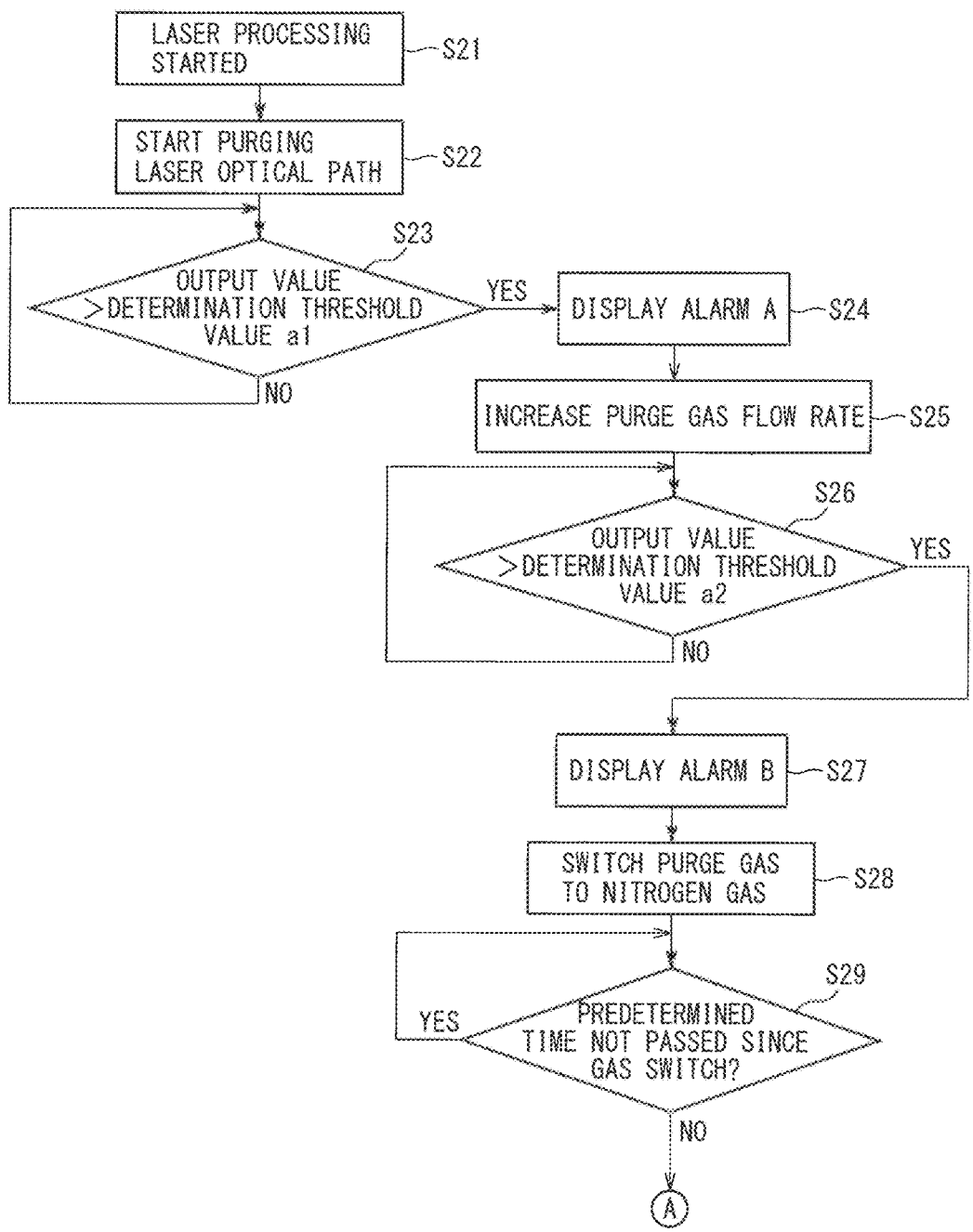
FIG. 9A is a flowchart illustrating a part of an operation flow of the laser processing system according to the third embodiment.
Figure 9B:
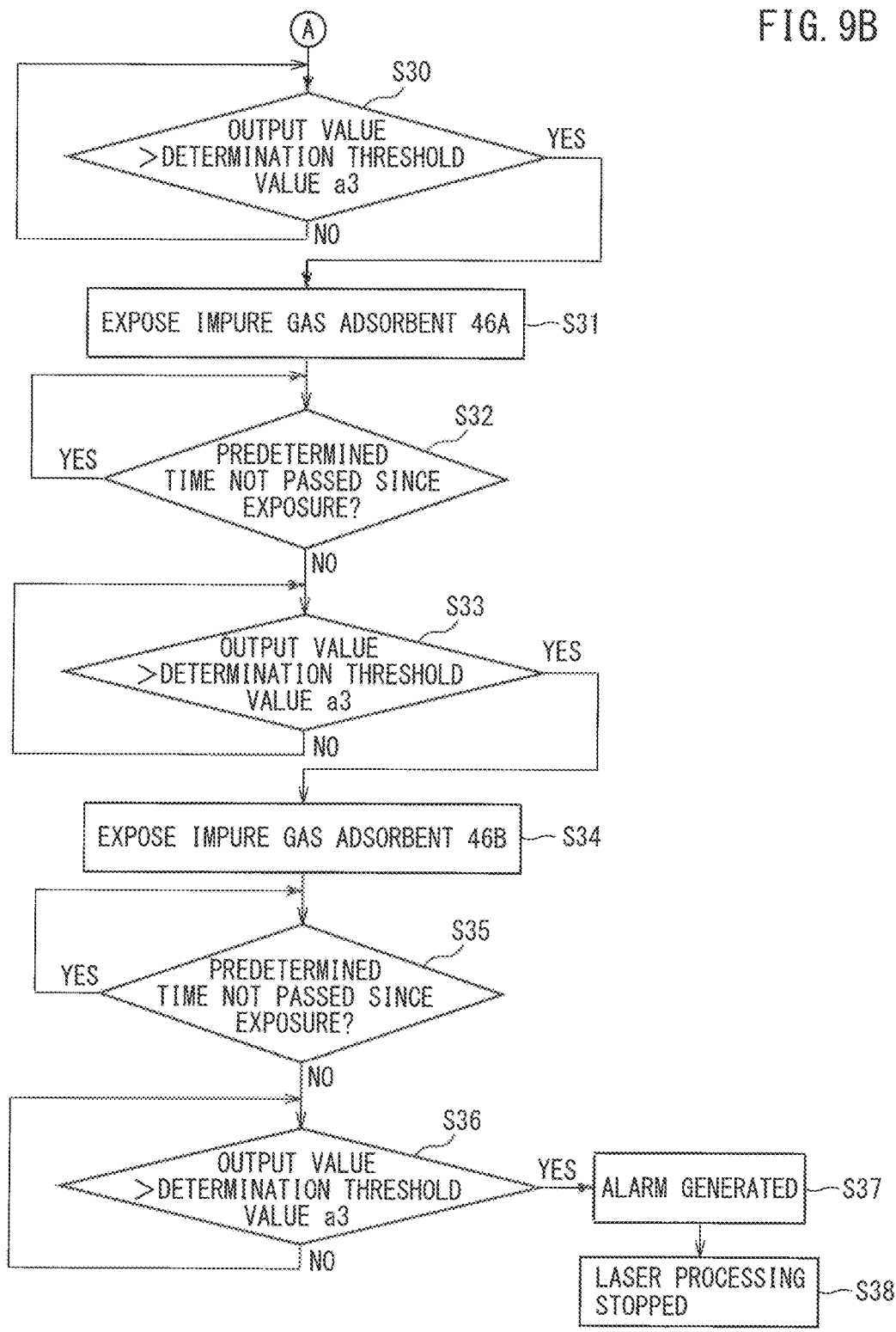
FIG. 9B is a flowchart illustrating a rest part of the operation flow of the laser processing system according to the third embodiment.

FIGS. 9A and 9B are a flowchart illustrating an example of an operation of the laser processing system according to the third embodiment. Note that an operation flow of the laser processing system according to the third embodiment is illustrated by being divided into FIGS. 9A and 9B. Then, connectors assigned the same number in both figures denote a part at which operation flows illustrated in FIGS. 9A and 9B are connected.

First, the laser processing system 10C is activated to start the laser processing (step S21 of FIG. 9A). Then, purging the laser optical path 15 is started (step S22 of FIG. 9A). At this time, the numerical value calculator 37 opens the opening and closing valve 23 of the supply line 22 as illustrated in FIG. 8 and supplies the clean dry air as the purge gas into the laser optical path 15. Further, a flow rate of the purge gas supplied into the laser optical path 15 is set to be an initial value, for example, 30 L/min by the flow rate adjustment valve 19.

Subsequently, the impure gas mixing determination unit 42 of the numerical value calculator 37 determines whether or not the output value of the microphone 51 is greater than a first determination threshold value a1 stored in the storage unit 41 (step S23 of FIG. 9A).

In step S23 as described above, when the output value of the microphone 51 is not greater than the first determination threshold value a1, the impure gas mixing determination unit 42 continues step S23 as described above. On the other hand, in step S23 as described above, when the output value of the microphone 51 is greater than the first determination threshold value a1, the impure gas mixing determination unit 42 determines that the impure gases were mixed in the laser optical path 15, and generates an alarm A, and, for example, displays the alarm message on the display device 38 (step S24 of FIG. 9A).

Further, after generation of the alarm A as described above, the numerical value calculator 37 controls the flow rate adjustment valve 19 to increase the purge gas flow rate as described above from the initial value to a predetermined value, for example, 60 L/min (step S25 of FIG. 9A).

Subsequently, the impure gas mixing determination unit 42 determines whether or not the output value of the microphone 51 is greater than a second determination threshold value a2 stored in the storage unit 41 (step S26 of FIG. 9A). Note that the second determination threshold value a2 is a value less than the first determination threshold value a1.

In step S26 as described above, when the output value of the microphone 51 is not greater than the second determination threshold value a2, the impure gas mixing determination unit 42 continues step S26. On the other hand, in step S26 as described above, when the output value of the microphone 51 is greater than the second determination threshold value a2, the impure gas mixing determination unit 42 determines that the impure gas concentration in the laser optical path 15 exceeds the threshold value, and generates an alarm B, and, for example, displays the alarm B on the display device 38 (step S27 of FIG. 9A). Note that the alarm B is preferably one different from a content of the alarm A as described above. Moreover, the second determination threshold value a2 in step S26 as described above is a value less than the first determination threshold value a1 in step S23 as described above. In other words, the purge gas flow rate is increased in step S25 as described above, which may have decreased the impure gas concentration in the laser optical path 15. Accordingly, in the present embodiment, to improve a determination accuracy in step S26, the second determination threshold value a2 is set to be less than the first determination threshold value a1 as described above.

Then, after generation of the alarm B as described above, the numerical value calculator 37 closes the opening and closing valve 23 of the supply line 22 as illustrated in FIG. 8 and opens the opening and closing valve of the supply line 21. Thereby, the numerical value calculator 37 switches the clean dry air used as the purge gas to the nitrogen gas (step S28 of FIG. 9A).

When a predetermined time has not passed since the purge gas is switched, the output value of the microphone 51 may not be stable. Consequently, the numerical value calculator 37 in the present embodiment determines whether or not the predetermined time has passed since the purge gas is switched (step S29 of FIG. 9A). Then, if the predetermined time has passed, the numerical value calculator 37 determines whether or not the output value of the microphone 51 is greater than a third determination threshold value a3 stored in the storage unit 41 (step S30 of FIG. 9B). Note that the third determination threshold value a3 in step S30 is a value further less than the second determination threshold value a2 in step S26 as described above. In other words, the purge gas is switched to the nitrogen gas in step S28 as described above, which may have further decreased the impure gas concentration in the laser optical path 15. Accordingly, in the present embodiment, to improve a determination accuracy in step S30, the third determination threshold value a3 is set to be further less than the second determination threshold value a2 as described above.

Then, in step S30 as described above, when the output value of the microphone 51 is not greater than the third determination threshold value a3, the impure gas mixing determination unit 42 continues step S30 as described above. On the other hand, in step S30 as described above, when the output value of the microphone 51 is greater than the third determination threshold value a3, the impure gas mixing determination unit 42 determines that the impure gases still remain in the laser optical path 15 and allows the shutter 47A to open to expose the impure gas absorbent 46A in the laser optical path 15 (step S31 of FIG. 9B).

Note that more or less time is needed to allow the impure gas absorbent 46A to absorb the impure gases. Thus, the numerical value calculator 37 in the present embodiment determines whether or not a predetermined time has passed since the exposure of the impure gas absorbent 46A (step S32 of FIG. 9B). Then, if the predetermined time has passed, the numerical value calculator 37 determines again whether or not the output value of the microphone 51 is greater than the third determination threshold value a3 (step S33 of FIG. 9B).

Further, in step S33 as described above, when the output value of the microphone 51 is not greater than the third determination threshold value a3, the impure gas mixing determination unit 42 continues step S33 as described above. On the other hand, in step S33 as described above, when the output value of the microphone 51 is greater than the third determination threshold value a3, the impure gas mixing determination unit 42 determines that the impure gases still remain in the laser optical path 15 and allows the shutter 47B to open to expose the impure gas absorbent 46B in the laser optical path 15 (step S34 of FIG. 9B). Note that, preferably, the shutter 47A is closed and the gas absorbent 46 is replaced by a new one while step S34 is performed.

Then, the numerical value calculator 37 determines whether or not a predetermined time has passed since the exposure of the impure gas absorbent 46B (step S35 of FIG. 9B). Then, if the predetermined time has passed, the numerical value calculator 37 determines again whether or not the output value of the microphone 51 is greater than the third determination threshold value a3 (step S36 of FIG. 9B).

Further, in step S36 as described above, when the output value of the microphone 51 is not greater than the third determination threshold value a3, the impure gas mixing determination unit 42 continues step S36 as described above. On the other hand, in step S36 as described above, when the output value of the microphone 51 is greater than the third determination threshold value a3, such a large amount of impure gases that the two impure gas absorbents 46A, 46B fail to absorb are presumably mixed in the laser optical path 15. Accordingly, the numerical value calculator 37 allows the communication device 39 to generate an alarm composed of sound, light, or a combination thereof (step S37 of FIG. 9B) and stops the laser processing (step S38 of FIG. 9B).

Note that, in the third embodiment as described above, abnormality of the propagation of the laser beam 11 is detected using a sound collecting device, such as the microphone 51, thereby detecting that the impure gases were mixed in the laser optical path 15. However, as a method of detecting abnormality of the propagation of the laser beam 11, methods as illustrated in FIGS. 10A and 10B other than the method using the microphone 51 may be conceived.

Figure 10A:
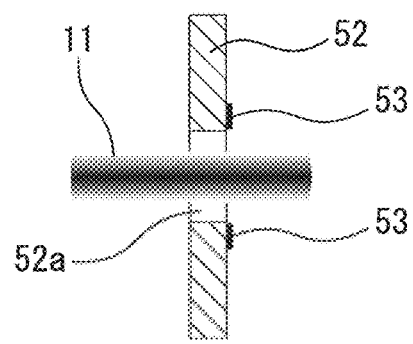
FIG. 10A is a diagram illustrating a first example of a method of detecting abnormality of the propagation of laser beam using a device other than a microphone.
Figure 10B:
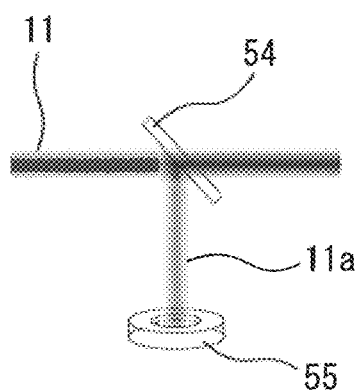
FIG. 10B is a diagram illustrating a second example of the method of detecting abnormality of the propagation of the laser beam using a device other than the microphone.
Figure 10C:
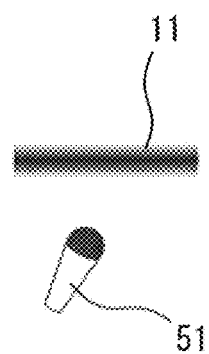
FIG. 10C is a diagram illustrating a method of detecting abnormality of the propagation of the laser beam using the microphone.

FIGS. 10A and 10B are each a diagram illustrating a method example of detecting abnormality of the propagation of laser beam 11 using a device other than the microphone 51. Moreover, FIG. 10C is a diagram illustrating a method of detecting abnormality of the propagation of the laser beam 11 using the microphone 51 as already described.

The method example as illustrated in FIG. 10A is a method of detecting abnormality of the propagation of laser beam 11 using a spreading effect of the laser beam 11 in the laser optical path 15 when the impure gases were mixed in the laser optical path 15. In the method example, as illustrated in FIG. 10A, a plate 52 including an opening portion 52a through which the laser beam 11 passes is installed in the laser optical path 15. Further, at a periphery portion of the opening portion 52a of the plate 52, a laser beam detector 53 is disposed. Then, when the laser beam 11 passing through the opening portion 52a of the plate 52 spreads due to the impure gases as described above, the spreading laser beam 11 is radiated by the laser beam detector 53 to be detected. Detection of such spreading of the laser beam 11 enables detection of abnormality of the propagation of laser beam 11.

In addition, the method example as illustrated in FIG. 10B is a method of detecting abnormality of the propagation of laser beam 11 using an effect of decreasing power of the laser beam 11 in the laser optical path 15 when the impure gases were mixed in the laser optical path 15. In the method example, as illustrated in FIG. 10B, a half mirror 54 is installed on an optical axis of the laser beam 11 in the laser optical path 15. Further, a beam power measuring device 55 that measures power of laser beam 11a partially reflected by the half mirror 54 is disposed in the laser optical path 15. Then, when power of the laser beam 11 decreases due to the impure gases as described above, power of laser beam 11a partially reflected by the half mirror 54 also decreases and an output value of the beam power measuring device 55 decreases. Monitoring such an output value of the beam power measuring device 55 enables detection of abnormality of the propagation of laser beam 11.

Note that, according to each of the embodiments as described above, the impure gas absorbents 46, 46A, 46B are exposed in the laser optical path 15 when the impure gases, i.e., gases that influence the propagation of the laser light 11 were mixed in the laser optical path 15 so that the impure gases as described above can be promptly discharged out of the laser optical path 15.

Moreover, the present invention has been described above using typical embodiments, but a person skilled in the art could understand it possible to make changes to each of the embodiments as described above and various other changes, deletions, and additions without departing from the scope of the present invention. Further, the scope of the present invention includes suitable combinations of each of the embodiments as described above.

Effects of Invention

According to the first aspect of the present invention, the impure gas absorbent for absorbing the impure gases that influence the propagation of the laser beam is exposed in the laser optical path so that the impure gas concentrations can be promptly decreased in the laser optical path.

According to the second aspect of the present invention, the purge gas that fails to influence the propagation of the laser beam can be supplied from the purge gas supply line into the laser optical path.

According to the third aspect and the fourth aspect of the present invention, when the impure gases were mixed in the laser optical path, the impure gas absorbent is exposed in the laser optical path so that the impure gas concentrations in the laser optical path can be decreased.

According to the fifth aspect, the sixth aspect, the seventh aspect, and the eighth aspect of the present invention, a mixing of the impure gases in the laser optical path can be accurately detected.

The invention claimed is:

1. A laser processing system comprising:
    a laser oscillator configured to oscillate a laser beam;
    a laser optical path comprising at least one of a pipe or bellows connecting the laser oscillator to a laser processing head, the at least one of the pipe or the bellows of the laser optical path guides the laser beam from the laser oscillator through a laser gas medium contained in the at least one of the pipe or the bellows of the optical path to the laser processing head for emission-towards an object to be processed;
    an impure gas absorbent integrated into the at least one of the pipe or the bellows of the laser optical path, the impure gas absorbent including material for absorbing an impure gas present in the at least one of the pipe or the bellows of the laser optical path, the impure gas influences propagation of the laser beam in the at least one of the pipe or the bellows of the laser optical path; and
    a shutter that is configured to expose the impure gas absorbent in the at least one of the pipe or the bellows of the laser optical path to absorb the impure gas in the at least one of the pipe or the bellows of the laser optical path
    a numerical value calculator configured to control the shutter to open and close.

2. The laser processing system according to claim 1, further comprising a purge gas supply line for supplying a purge gas into the laser optical path.

3. The laser processing system according to claim 1, further comprising an impure gas mixing detection device that is configured to detect that the impure gas was mixed in the laser optical path.

4. The laser processing system according to claim 3, wherein the exposure function part is configured to expose the impure gas absorbent in the laser optical path when the impure gas mixing detection device detected that the impure gas was mixed in the laser optical path.

5. The laser processing system according to claim 3, wherein the impure gas mixing detection device includes at least one gas sensor that detects the impure gas.

6. The laser processing system according to claim 3, wherein the impure gas mixing detection device includes a microphone that detects that the impure gas was mixed in the laser optical path by collecting a sound when the laser beam propagates in the laser optical path.

7. The laser processing system according to claim 3, wherein the impure gas mixing detection device includes a plate having an opening portion and a laser beam detector positioned in the opening portion to detect that the impure gas was mixed in the laser optical path by detecting spreading of the laser beam in the laser optical path.

8. The laser processing system according to claim 3, wherein the impure gas mixing detection device includes a beam power measuring device that detects that the impure gas was mixed in the laser optical path by detecting decreasing of a power of the laser beam in the laser optical path.

* * * * *